United States Patent
Harik

(10) Patent No.: US 8,516,357 B1
(45) Date of Patent: *Aug. 20, 2013

(54) LINK BASED CLUSTERING OF HYPERLINKED DOCUMENTS

(75) Inventor: Georges R. Harik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 446 days.

This patent is subject to a terminal disclaimer.

(21) Appl. No.: 12/959,141

(22) Filed: Dec. 2, 2010

Related U.S. Application Data

(63) Continuation of application No. 11/693,522, filed on Mar. 29, 2007, now abandoned, which is a continuation of application No. 09/636,052, filed on Aug. 10, 2000, now Pat. No. 7,213,198.

(60) Provisional application No. 60/148,854, filed on Aug. 12, 1999.

(51) Int. Cl.
G06F 17/00 (2006.01)
G06F 17/20 (2006.01)

(52) U.S. Cl.
USPC ............ 715/200; 715/206; 715/207; 715/208

(58) Field of Classification Search
USPC .................. 715/200, 206, 207, 208
See application file for complete search history.

(56) References Cited

U.S. PATENT DOCUMENTS

| | | | |
|---|---|---|---|
| 5,761,436 A | 6/1998 | Nielsen | |
| 5,835,905 A * | 11/1998 | Pirolli et al. | 1/1 |
| 5,847,708 A * | 12/1998 | Wolff | 715/764 |
| 5,875,446 A | 2/1999 | Brown et al. | |
| 5,890,172 A | 3/1999 | Borman et al. | |
| 5,920,859 A | 7/1999 | Li | |
| 5,941,944 A | 8/1999 | Messerly | |
| 5,999,664 A * | 12/1999 | Mahoney et al. | 382/305 |
| 6,038,574 A | 3/2000 | Pitkow et al. | |
| 6,049,799 A * | 4/2000 | Mangat et al. | 1/1 |
| 6,078,913 A * | 6/2000 | Aoki et al. | 1/1 |
| 6,112,203 A * | 8/2000 | Bharat et al. | 1/1 |
| 6,122,647 A | 9/2000 | Horowitz et al. | |
| 6,167,397 A | 12/2000 | Jacobson et al. | |
| 6,182,066 B1 * | 1/2001 | Marques | 1/1 |
| 6,272,505 B1 * | 8/2001 | De La Huerga | 715/235 |
| 6,285,999 B1 | 9/2001 | Page | |
| 6,345,253 B1 | 2/2002 | Viswanathan | |
| 6,353,827 B1 * | 3/2002 | Davies et al. | 707/769 |
| 6,356,898 B2 | 3/2002 | Cohen et al. | |

(Continued)

OTHER PUBLICATIONS

Judit Bar-Ilan et al., "3rd International Workshop on Web Dynamics", May 18, 2004, 125 pages.

(Continued)

Primary Examiner — Doug Hutton, Jr.
Assistant Examiner — Soumya Dasgupta
(74) Attorney, Agent, or Firm — Harrity & Harrity, LLP

(57) ABSTRACT

Techniques for grouping hyperlinked documents are provided. Links near or in the neighborhood of the hyperlinked documents are analyzed in order to group the hyperlinked documents by topic. For example, links that are search results can be grouped by identifying other hyperlinked documents that have multiple forward links to the search results. The search results can then be grouped according to the forward links of the other hyperlinked documents.

20 Claims, 18 Drawing Sheets

(56) References Cited

U.S. PATENT DOCUMENTS

| | | |
|---|---|---|
| 6,385,602 B1 | 5/2002 | Tso et al. |
| 6,446,061 B1 * | 9/2002 | Doerre et al. ................ 707/738 |
| 6,457,028 B1 | 9/2002 | Pitkow et al. |
| 6,510,406 B1 | 1/2003 | Marchisio |
| 6,549,935 B1 | 4/2003 | Lapstun et al. |
| 6,562,077 B2 * | 5/2003 | Bobrow et al. ............... 715/204 |
| 6,574,644 B2 * | 6/2003 | Hsu et al. ..................... 715/205 |
| 6,665,715 B1 | 12/2003 | Houri |
| 6,675,170 B1 | 1/2004 | Flake |
| 6,728,752 B1 | 4/2004 | Chen et al. |
| 6,990,628 B1 * | 1/2006 | Palmer et al. ................. 715/234 |
| 7,213,198 B1 | 5/2007 | Harik |
| 2001/0047375 A1 | 11/2001 | Fest |
| 2001/0049698 A1 | 12/2001 | Hsu et al. |
| 2002/0035611 A1 | 3/2002 | Dooley |

OTHER PUBLICATIONS

Haffner et al., "Request-Prediction and Hyperlink-Proposals", Nov. 2000, 177 pages.

Blank et al., "Interactive Gradebook: The Missing (Hyper)Link", 1998, 5 pages.

Rennie et al., "Using Reinforcement Learning to Spider the Web Efficiently", 1999, 10 pages.

Rennie et al., "Efficient Web Spidering with Reinforcement Learning", 1999, 13 pages.

* cited by examiner

Google!
BETA jaguar 10 results

Google Search  I'm feeling lucky

---

At least 9749 matches for jaguar
Showing results 1-10, Search took 0.14 seconds
Clicking on a red bar searches for backlinks (citations).
How do I interpret the results?

▬▬▭ Jaguar Cars Global Home Page
... Jaguar Cars Official Web Site. Jaguar Cars Official Web Site...
...Jaguar Cars Official Web Site. Jaguar Cars Official Web Site...
www.jaguarcars.com/ Cached (5k)

▬▬▭ USS Jaguar
...to the USS Jaguar, the first and largest Star Trek site for kids. I am...
...be like a fictitious starship named Jaguar. Here anyone under 18 can join...
www.worldkids.net/jaguar/ Cached (5k)

▬▬▭ The Jaguar Collection - Official Web site
www.collection.co.uk/ Cached (2k)

▬▬▭ Welcome to Jag-lovers - the Jaguar Enthusiasts place on the Internet
...-INFORMATION Brochures | Buyer's Guide | Jaguar Specialists Web |...
...(Windows) | Windows Wallpaper | -JAGUAR MODEL RELATED E-Type | Lump...
www.jag-lovers.org/ Cached (14k)

▬▬▭ Jaguar/Daimler used parts exchange
    ... Brochures Buyer's Guide Jaguar Specialists Web...
    ...(Windows) Windows Wallpaper -JAGUAR MODEL RELATED E-Type...
    www.jag-lovers.org/HyperNews/get/jagswap.html Cached (87k)

▬▬▭ Jaguar Interactive II -- The Premier 24-Hour Atari Jaguar Discussion Board
... Jaguar Interactive II - Hosted by Atari Gaming Headquarters - Other...
...Jag-@-Zine | JagFest '98 | JagFest '99 | Jaguar, MA | Jaguar's...
www.atarihq.com/interactive/ Cached (30k)

▬▬▭ Classic Car Source -- Welsh Jaguar Classic Car Museum
...WELSH JAGUAR CLASSIC CAR MUSEUM And JAGGIN' AROUND RESTAURANT AND PUB "A...
...CELEBRATION OF THE GLORY DAYS OF THE JAGUAR" The WELSH JAGUAR...
www.classicar.com/museums/welshjag/welshjag.htm Cached (3k)

▬▬▭ Jaguar Club of Florida
...Welcome to the Jaguar Club of Florida! This is our place on the...
...meetings, sponsored events and activities! Jaguar Cooks! - A brand new...
www.magicnet.net/~jaguar/jcof.html Cached (6k)

▬▬▭ Tomb of the Jade Jaguar Slide Lecture, Maya treasures of Tikal, Guatemala

FIG. 8A

CO-CITATION MATRIX 851

|   | A | B | C | D | E |
|---|---|---|---|---|---|
| A |   | 1 | 1 |   |   |
| B |   |   | 2 |   |   |
| C |   |   |   |   |   |
| D |   |   |   |   | 1 |
| E |   |   |   |   |   |

FIG. 12A

RELATIONSHIP VECTOR 901

$\begin{pmatrix} A \\ B \end{pmatrix} \begin{pmatrix} A \\ C \end{pmatrix} \begin{pmatrix} B \\ C \end{pmatrix} \begin{pmatrix} D \\ E \end{pmatrix}$

FIG. 12B $$\text{SIMILARITY (A, B)} = \frac{\text{CO-CITATION (A, B)} - \frac{\alpha \, \text{NumBL(A)} \cdot \text{NumBL(B)}}{w}}{\sqrt{\text{NumBL(A)} \cdot \text{NumBL(B)}}}$$

EXAMPLE:

CO-CITATION (A, B) = 1
NumBL(A) = 2
NumBL(B) = 2
$\alpha$ = 10
w = 100,000,000

$$\text{SIMILARITY (A, B)} = \frac{1 - \frac{10 \cdot 2 \cdot 2}{100,000,000}}{\sqrt{2 \cdot 2}}$$

$\approx 1/2$

FIG. 13

PROJECT GEORGES!

Clustering for 'saturn'

Invoking Project Georges ... please wait!

Running grouper...

Waiting for it to finish...

Looking for results...

Reading the results...

Cleaning up...

Waiting for cleanup...

---

- Saturn
  pds.jpl.nasa.gov/planets/welcome/saturn.htm (C:0.866863 P:0.55111)     ← 1201
- Cassini: Voyage to Saturn
  www.jpl.nasa.gov/cassini/ (C:0.855673 P:0.586221)
- NSSDC Photo Gallery: Saturn
  nssdc.gsfc.nasa.gov/photo_gallery/photogallery-saturn.html (C:0.855624 P:0.492393)
- Saturn
  www.hawastsoc.org/solar/eng/saturn.htm (C:0.834942 P:0.510658)
- The 1995-6 Saturn Ring Plane Crossings
  ringside.arc.nasa.gov/www/rpx/rpx.html (C:0.810368 P:0.473472)
- Saturn
  www.seds.org/nineplanets/nineplanets/saturn.html (C:0.805337 P:0.551736)
- Saturn
  nssdc.gsfc.nasa.gov/planetary/planets/saturnpage.html (C:0.774866 P:0.492622)
- No Title
  ringside.arc.nasa.gov/www/saturn/saturn.html (C:0.755906 P:0.45388)
- Saturn Fact Sheet
  nssdc.gsfc.nasa.gov/planetary/factsheet/saturnfact.html (C:0.749132 P:0.474296)
- No Title
  www.jpl.nasa.gov/cassini (C:0.710059 P:0.575479)
- No Title

FIG. 18A newproducts.jpl.nasa.gov/saturn/ (C:0.70551 P:0.483345)
- Saturn Picture List
  www.seds.org/nineplanets/nineplanets/pxsat.html (C:0.695906 P:0.49987)
- Saturn
  spacer.com/nineplanets/saturn.html (C:0.688069 P:0.361059)
- Saturn's spokes in rings
  www.hawastsoc.org/solar/cap/sat/spoke.htm (C:0.657886 P:0.416526)
- Saturn Ring Plane Crossings of 1995-1996 (JPL)
  www.jpl.nasa.gov/saturn/ (C:0.656777 P:0.383734)
- Hubble Space Telescope Views Major Storm on Saturn
  www.hawastsoc.org/solar/cap/sat/vsatstrm.htm (C:0.651163 P:0.386542)
- Saturn
  www.star.le.ac.uk/edu/nineplanets/saturn.html (C:0.650382 P:0.341283)
- Saturn Events
  www.isc.tamu.edu/~astro/saturn.html (C:0.646718 P:0.464393)
- Cassini UVIS Inernet Site
  lasp.colorado.edu/cassini/ (C:0.645669 P:0.493858)
- StarDate Online | Solar System Guide | Saturn
  stardate.utexas.edu/resources/ssguide/saturn.html (C:0.64 P:0.482643)
- SATURN IMAGES
  vraptor.jpl.nasa.gov/voyager/vgrsat_img.html (C:0.639535 P:0.456519)
- The Planet Saturn
  wwwflag.wr.usgs.gov/USGSFlag/Space/wall/saturn.html (C:0.639053 P:0.452598)
- No Title
  ringside.arc.nasa.gov/saturn/satrun.html (C:0.634215 P:0.434501)
- Voyager Saturn Science Summary
  www.hawastosc.org/solar/eng/vgrsat.htm (C:0.628713 P:0.453529)
- The Solar System - Saturn
  www.jpl.nasa.gov/solarsystem/saturn/ (C:0.627907 P:0.523598)
- Saturn Image & Animation Index
  www.hawastsoc.org/solar/cap/sat/ (C:0.610045 P:0.386236)
- Artwork of Saturn and Its Satellites
  www.jpl.nasa.gov/cassini/Images/artwork/ (C:0.608187 P:0.446021)
- Exploring The Planets - Pioneer Encounters Saturn
  www.nasm.edu/ceps/ETP/SATURN/satpioneer.html (C:0.606299 P:0.408835)
- Saturn
  www.hpcc.astro.washington.edu/mirrors/nineplanets/saturn.html (C:0.587209 P:0.397482)
- Saturn [Oulu]
  www.oulu.fi/~spaceweb/textbook/saturn.htm (C:0.581992 P:0.368475)
- 
  www.jpl.nasa.gov/saturn/iau6192.html (C:0.566929 P:0.355337)
- No Title
  www.sierranet.net/~elengyel/astro.html (C:0.566929 P:0.375875)
- No Title
  bang.lanl.gov/solarsys/saturn.htm (C:0.566929 P:0.430716)
- No Title
  esther.la.asu.edu/asu_tes/TES_Editor/SOLAR_SYST_TOUR/Saturn.html (C:0.566929 P:0.442466)
- Info about Saturn and Outer Space
  www.jpl.nasa.gov/cassini/MoreInfo/outrchinfo.html (C:0.56 P:0.416022)
- Pseudo-image of Saturn's Ring
  www.hawastsoc.org/solar/cap/sat/s-ring.htm (C:0.556922 P:0.292241)
- Saturn Without a Ring

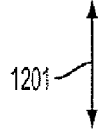 1201

FIG. 18B

- www.hawastsoc.org/solar/cap/sat/satnr.htm (C:0.556922 P:0.292241)
- Saturn
  www.pitagoras.g12.br/planetas/nineplanets/saturn.html (C:0.554887 P:0.291173)
- Saturn Images Menu
  emma.la.asu.edu/SOLAR_SYST_TOUR/Saturn.html (C:0.551181 P:0.457847)
- Saturn
  www.star.le.ac.uk/edu/solar/saturn.html (C:0.54386 P:0.385916)
- Saturn Viewer 1.1 Short Form
  ringside.arc.nasa.gov/www/rpx/viewer/shortform.html (C:0.54386 P:0.393744)
- No Title
  nssdc.gsfc.nasa.gov/photo_gallery/PhotoGallery-Saturn.html (C:0.535433 P:0.381491)
- Saturn's Possible New Moons
  www.seds.org/nineplanets/nineplanets/newsats.html (C:0.535433 P:0.482292)

⎫ 1201

- Welcome to the Saturn Cars Web Site
  www.saturncars.com/ (C:0.997514 P:0.557076)
- 
  www.saturncars.com/communication/index3.html (C:0.952756 P:0.508095)
- The 1998 Saturn Line
  www.saturncars.com/car/models/ (C:0.666667 P:0.458915)
- Saturn's Frequently Asked Questions
  www.saturncars.com/communication/faq.html (C:0.597633 P:0.432074)
- Saturn of Arkansas
  www.saturnar.com/ (C:0.594143 P:0.311772)
- No Title
  www.gmcanada.com/english/vehicles/satu.html (C:0.584795 P:0.418006)
- Saturnalia - the Saturn Enthusiasts Site
  www.erols.com/core/ (C:0.581395 P:0.353033)
- Saturn of Fremeont Home Page
  www.saturnfr.com/ (C:0.579882 P:0.392782)
- About the SATURN web site
  www.saturncars.com/about/ (C:0.551181 P:0.411856)
- Saturn Albany Home Page
  www.saturnalbany.com/ (C:0.551181 P:0.317662)

⎫ 1203

- Sega Online - Products: Saturn
  www.sega.com/products/hardware/saturn/ (C:0.700085 P:0.402884
- Game Revolution Sega Saturn Reviews
  www.game-revolution.com/games/saturn/saturn.htm (C:0.685039 P:0.465736
- Phil's site--Sega Saturn World
  www.mcn.net/~montanasites/segaSaturn.htm (C:0.657798 P:0.345174)
- New and Used Video Games at Used GAMES! - SEGA SATURN :-)
  www.usedvideogame.com/sega/saturn/sat.htm (C:0.629921 P:0.343644)
- Sega Saturn Index (Sega Force: Index: Systems: Saturn)
  www.cyberdrive.net/~gskalba/saturn.htm (C:0.543307 P:0.325124)

LINK BASED CLUSTERING OF HYPERLINKED DOCUMENTS

RELATED APPLICATIONS

This application is a continuation of U.S. patent application Ser. No. 11/693,522, filed Mar. 29, 2007, which is a continuation of U.S. patent application Ser. No. 09/636,052, filed Aug. 10, 2000 (now U.S. Pat. No. 7,213,198), which claims the benefit of U.S. Provisional Application No. 60/148,854, filed Aug. 12, 1999, the disclosures of which are hereby incorporated herein by reference.

BACKGROUND OF THE INVENTION

The present invention relates to grouping (or clustering) hyperlinked documents. More specifically, the invention relates to techniques for grouping hyperlinked documents from a search so that the links to hyperlinked documents about the same (or similar) topic can be displayed together.

The World Wide Web (or "Web") contains a vast amount of information in the form of hyperlinked documents (e.g., web pages). One of the reasons for the virtually explosive growth in the number of hyperlinked documents on the Web is that just about anyone can upload hyperlinked documents, which can include links to other hyperlinked documents. Although there is no doubt that there is a vast amount of useful information on the Web, the unstructured nature of the Web can make it difficult to find the information that is desired.

A search engine attempts to return relevant information in response to requests from users. These requests usually come in the form of queries (e.g., sets of words that are related to the desired topic). Search engines typically return a number of links to web pages, with a brief description of those pages. Because the number of pages on the Web is huge, ensuring that the returned pages are relevant to the topic the user had in mind is a central problem in web searching. Possibly the simplest and most prevalent way of doing this is to find web pages containing all or many of the words included in the query, which can be called text-based searching.

Text-based searching over the Web can be notoriously imprecise and several problems arise in its use. To begin with, usually a large number of web pages match the user's query. Displaying all of these pages to the user becomes impractical and some method of ordering these results should be used. Methods that assess and use the quality of the pages, returning only well-linked pages for example, can significantly improve the quality of the returned results. However, the returned results can still range over a number of different topics, only one of which the user had in mind.

Consider, for example, a search query including only the word "Saturn." This query can refer to the Saturn brand of car, the planet Saturn, the Sega Saturn game system, or the Roman god Saturn. Most likely, the user is interested in only one of the above topics. However, a search engine searching for this word would come up with a mishmash of results from among all of these topics. A user interested in the Saturn car would have to wade through many irrelevant search results to get the information she desires.

One solution to this problem utilizes user feedback. After the user notices that the results include links from a number of different topics, the user can narrow or focus the search to only the one topic in which the user is interested. For example, the user could add the word "car" to the query. This solution has at least two negative aspects. First, it can exclude high quality relevant pages, which include the word Saturn but not "car" (e.g., uses "automobile" instead). More importantly, it forces the user to go through extra hoops in specifying her query. The user is in fact forced to think like a textual search engine and attempt to guess what words would be included in the topic she is interested in and not in other topics matching her original query. Guessing at the search engine's behavior can become an iterative and counterproductive nightmare.

As the size of the Web continues to increase, it becomes increasingly more desirable to have innovative techniques for efficiently grouping hyperlinked documents by topic. By displaying the links to web pages grouped by topic, a search engine can provide some coherence (i.e., not jump from one topic to another and then back again) to the search results. Additionally, it would be beneficial to have techniques that are efficient at grouping search results by topic by analyzing the link structure of the Web.

SUMMARY OF THE INVENTION

The present invention provides innovative techniques for grouping hyperlinked documents. In general, links near or in the neighborhood of the hyperlinked documents are analyzed in order to group the hyperlinked documents by topic. For example, links that are search results can be grouped by identifying other hyperlinked documents that have multiple forward links to the search results. The search results can then be grouped according to the forward links of the other hyperlinked documents. Embodiments of the invention can therefore utilize the existing link structure of the Web to group the search results according to topic. Some specific embodiments of the invention are described below.

In one embodiment, the invention provides a computer implemented method of grouping hyperlinked documents. Links to hyperlinked documents are received and other hyperlinked documents are identified that have forward links to the initial hyperlinked documents. The hyperlinked documents are grouped according to the forward links of the other hyperlinked documents. Where the hyperlinked documents are results from a search, the links to the hyperlinked documents can be displayed in groups separated graphically on the screen.

In another embodiment, the invention provides a computer implemented method of grouping hyperlinked documents. An initial set of links to hyperlinked documents is received. The initial set is expanded to include links to additional hyperlinked documents that have a forward link to or are pointed to by a hyperlinked document in the initial set, thereby generating an expanded set of links. A back link list of links to hyperlinked documents is identified that have forward links to the hyperlinked documents in the expanded set. The hyperlinked documents in the initial set are then grouped according to the forward links of the hyperlinked documents in the back link list of links. In other cases, the hyperlinked documents may be grouped according to link information that is more than one level back from those documents.

In another embodiment, the invention provides a computer implemented method of grouping hyperlinked documents. Groups of hyperlinked documents are received, each group including at least one hyperlinked document. A similarity measure is calculated between a pair of groups of hyperlinked documents, the similarity measure based on the number of hyperlinked documents that have forward links to each of the pair of groups of hyperlinked documents. The pair of groups of hyperlinked documents are merged if the similarity measure crosses a threshold. In some embodiments, the similarity measure can be reduced by the product of the number of forward links to each of the pair of groups of hyperlinked documents.

In another embodiment, the invention provides a computer implemented method of grouping hyperlinked documents. Links to hyperlinked documents are received. The hyperlinked documents are grouped according to forward links to the hyperlinked documents in other hyperlinked documents. The links to the hyperlinked documents are displayed in groups.

Other features and advantages of the invention will become readily apparent upon review of the following description and association with the accompanying drawings, where the same or similar structures are designated with the same reference numerals.

BRIEF DESCRIPTION OF THE DRAWINGS

FIGS. 8A and 8B show a web page example of the search results for the query "jaguar."

FIG. 12A shows a co-citation matrix and FIG. 12B shows a relationship vector.

FIG. 13 shows an example of an equation that can be utilized to measure the similarity of hyperlinked documents or groups of hyperlinked documents.

FIGS. 18A-18C show a web page example of search results being grouped by topic.

DETAILED DESCRIPTION OF PREFERRED EMBODIMENTS

In the description that follows, the present invention will be described in reference to embodiments that group hyperlinked documents (e.g., web pages). More specifically, the embodiments will be described in reference to embodiments that group the web pages from a search by topic so that the user can better find the desired information. However, embodiments of the invention are not limited to any particular environment, application or specific implementation. For example, the embodiments described below can be advantageously applied to grouping hyperlinked documents on a local intranet for a number of diverse uses, such as for organizing hyperlinked documents at an institution. Therefore, the description of the embodiments that follows is for purposes of illustration and not limitation.

Figure 1:
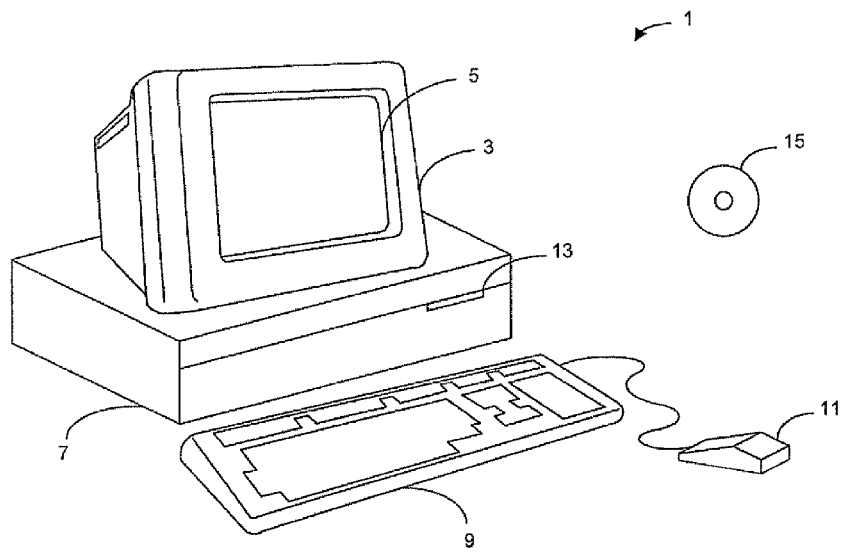
FIG. 1 illustrates an example of a computer system that can be utilized to execute the software of an embodiment of the invention.

FIG. 1 illustrates an example of a computer system that can be used to execute the software of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
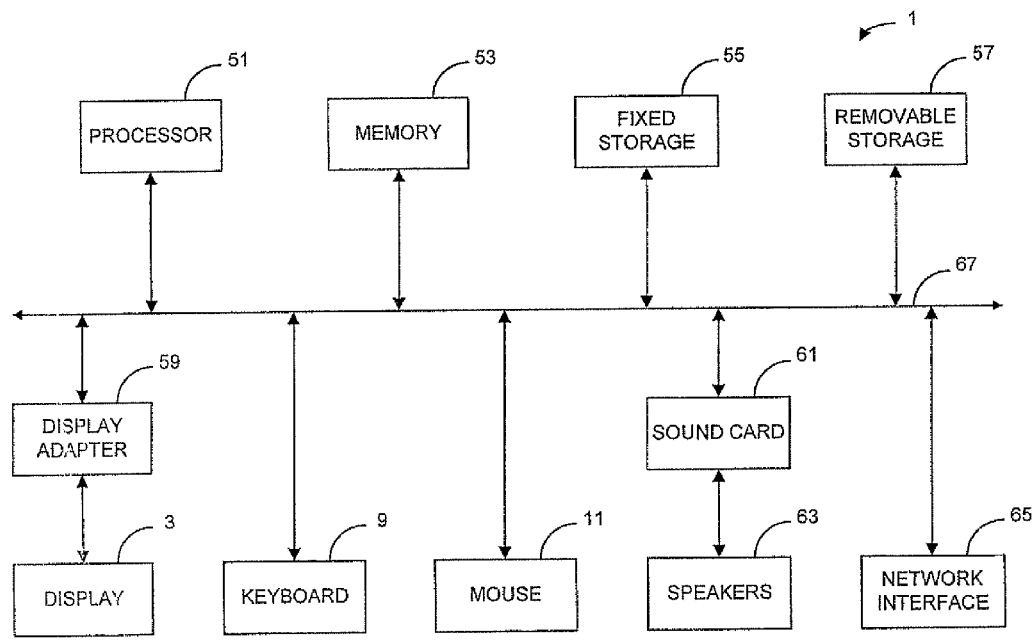
FIG. 2 illustrates a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
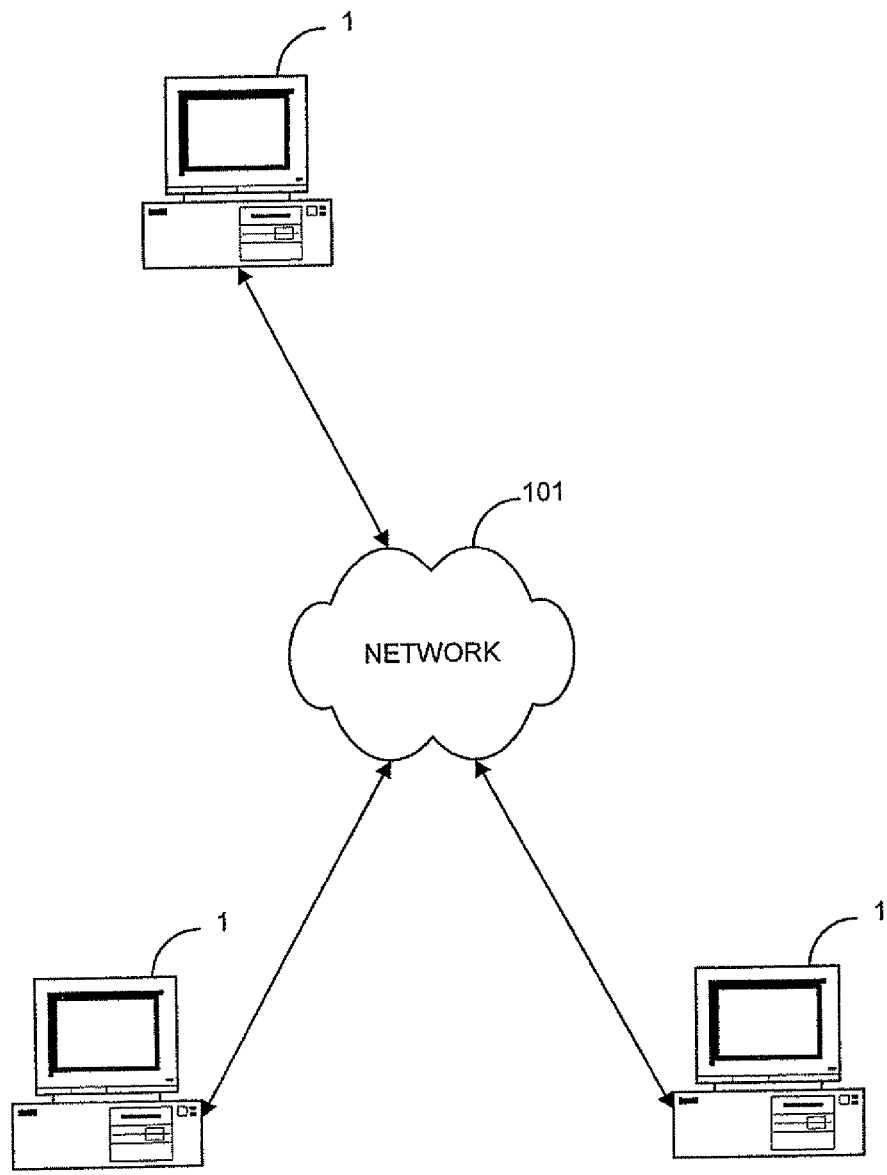
FIG. 3 illustrates a network of multiple computer systems including wide area networks and local area networks.

FIG. 3 shows a network of multiple computer systems. A network 101 provides communication between multiple computer systems 1. In a wide area network such as the Internet, some of the computer systems are servers (or hosts) and provide access to resources or services to client computer systems on the network. With respect to web pages, there are multiple server computer systems that store the web pages that make up the Web. The web pages typically include links in the form of uniform resource locators (URLs) that are a link to another web page, whether it is on the same server or a different one.

As described above, the Web is a distributed network of web pages. Networks of hyperlinked documents can also be present in local area networks (e.g., intranets). The operation of these intranets is very similar to the Internet except that it is not uncommon for all or a majority of the hyperlinked documents of an intranet to be stored on a single server computer system.

Clustering is the general term for a technology that identifies groups of similar objects among a given set. For example, consider the words {cat, dog, airplane, bus, automobile, giraffe}. A clustering of this set could divide it into two parts. One part, {cat, dog, giraffe}, would describe animals, while the other, {automobile, bus, airplane} would describe vehicles of travel. This is essentially what the invention can provide with respect to web pages, grouping together sets of web pages that are on the same topic. In our example however, we used our background knowledge of the given entities to do this grouping ourselves. In the case of web pages, it would be desirable to provide a suitable alternative to this knowledge base that lends itself to being automated. One aspect of the invention is that the link structure of the Web itself provides such information.

Consider that pages on the same general topic are likely to be linked to from the same set of pages. Take, for example, the Saturn query described above. It makes sense that two pages on the Saturn car could be linked to from a common page (e.g., a page reviewing cars). However, it is extremely unlikely that any page on the Web links to one page talking about the Saturn automobile and another about the Sega Saturn game system. Although this can happen, statistical methods can be used to discount the effects of such an unlikely occurrence. Thus, by utilizing the link structure of the Web, pages that are on the same topic can be grouped together.

Standard clustering techniques usually require the definition of a distance between pairs of the objects to be clustered. Pages that are close together are then more likely to be about the same topic than those that are far apart. One way to define this distance is to consider the co-citation number of a pair of web pages. The co-citation number is the number of pages that link to both pages simultaneously. The higher this number, the more related are the pair of pages, and thus the smaller the distance between them should be. Therefore, the inverse of the co-citation number can be utilized as a definition of distance.

Figure 4:
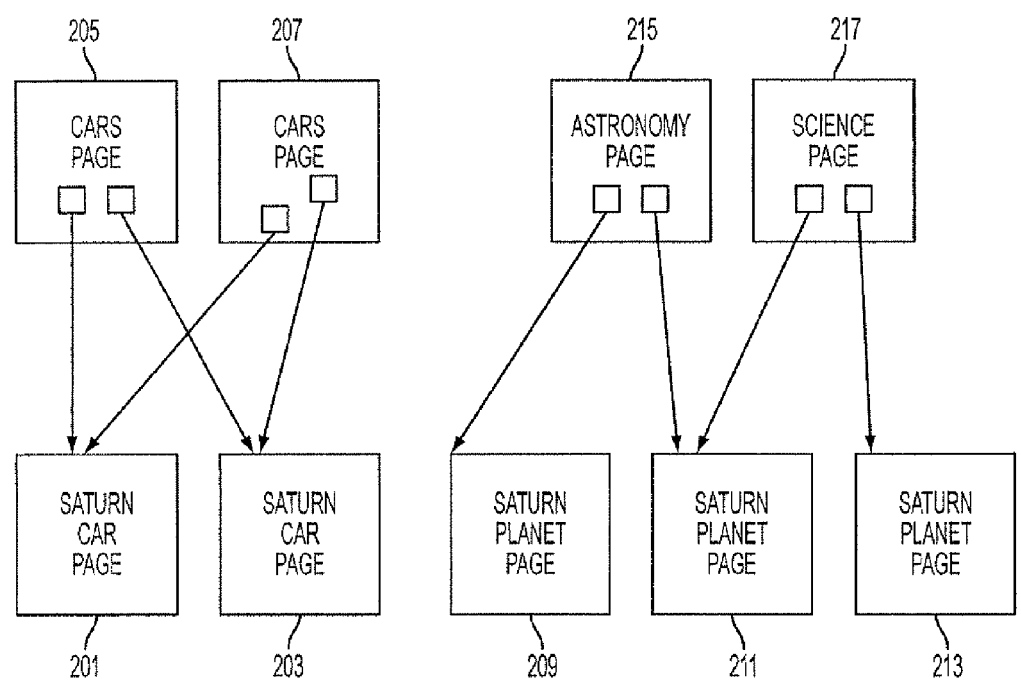
FIG. 4 shows an example of links between web pages relating to Saturn cars and the planet Saturn.

FIG. 4 shows an example of links between web pages relating to Saturn cars and the planet Saturn. The Saturn pages could be the results from a search and this simplified example will be utilized to illustrate grouping of web pages. Assume that web pages 201, 201, 209, 211, and 213 resulted from the query for pages related to the word "Saturn." Pages 201 and 203 are related to the Saturn car. As shown, pages 201 and 203 are linked to from two more general pages on cars, web pages 205 and 207, respectively.

Pages 209-213 are related to the planet Saturn. These three pages are linked to from more general pages on astronomy and science, web pages 215 and 217, respectively. However, because web pages typically focus on a small number of topics, it is unlikely that astronomy page 215 would link to one of the Saturn car pages 201 or 203. In this example, the two Saturn car pages are given a co-citation number of 2, because there are two web pages, pages 205 and 207, that have forward links to each of the web pages. Similarly, Planet Saturn pages 209 and 211 have a co-citation number of 1 as do Planet Saturn pages 211 and 213 (each pair of pages only has one web page that has a forward link to each web page of the pair). It should be noted that Planet Saturn pages 209 and 213 have a co-citation number of 0 (no web pages have links to both pages), and therefore initially may seem unrelated.

Using standard clustering techniques in conjunction with this definition of distance may not always lead to good results. Consider that most pages are linked to by only a small number of other pages, and therefore, under this definition most pairs of pages will have a co-citation number of 0, and therefore be very far apart. This may be true not only for truly unrelated pages, but also for pages that are on the same topic. This is exactly what happened between Planet Saturn pages 209 and 213 in the example above. However, this violates one desirable rule of such a distance definition, that if page A is close to page B, and page B is close to page C, then page A should not be very far from page C. Although this goal of transitivity may seem intuitive, and certainly holds for distances in the physical world, it may not hold for some definitions of distance over the Web, because there is too little citation information available for most pairs of pages.

One solution to this problem is not to assign a distance between two web pages, such as pages 209 and 213, until further information about the pages is ascertained. This technique can utilize hierarchical clustering. With hierarchical clustering, initially each page can be considered its own group. Two groups that are very close together are then merged into one group. This accomplishes two things. First, it gets closer to the end goal of a complete grouping of the set of results. Second, more information can be obtained about each of the two groups to be merged. More specifically, it is known that the new group is related to another page if any of its members are related to that page.

Hierarchical clustering benefits from a new definition for distances, one that relates not only pairs of pages, but also pairs of groups of pages. One approach, for example, is to use the distance between the closest pair of pages, one from each group. A potentially better distance measure is to use the co-citation number as applied not only to individual pages, but also to pages in a group. Thus, the co-citation number can be applied to groups of pages. To get the distance between two groups of pages, the number of pages that link to both groups simultaneously can be counted. The inverse of this number can then be used as a distance measure between the groups of web pages.

Returning to our example in FIG. 4, Saturn car planet pages 209 and 211 may be first grouped together because they are related as evidenced by a co-citation number of 1 (this number is relatively low because of the simplicity of the example). Now, science page 217 links to both Planet Saturn page 213 and the group including Planet Saturn pages 209 and 211. Therefore, these two groups (recall that each page would be considered a group initially) have a co-citation number of 1 and are therefore related so they can be merged into a single group. By utilizing this definition of relatedness, Planet Saturn pages 209 and 213 have been related and a group can be created that includes Planet Saturn pages 209-213. This distance measure may be highly precise with an advantage that as groups of pages get larger, there are more links to utilize, and therefore a better distance measure results.

Figure 5:
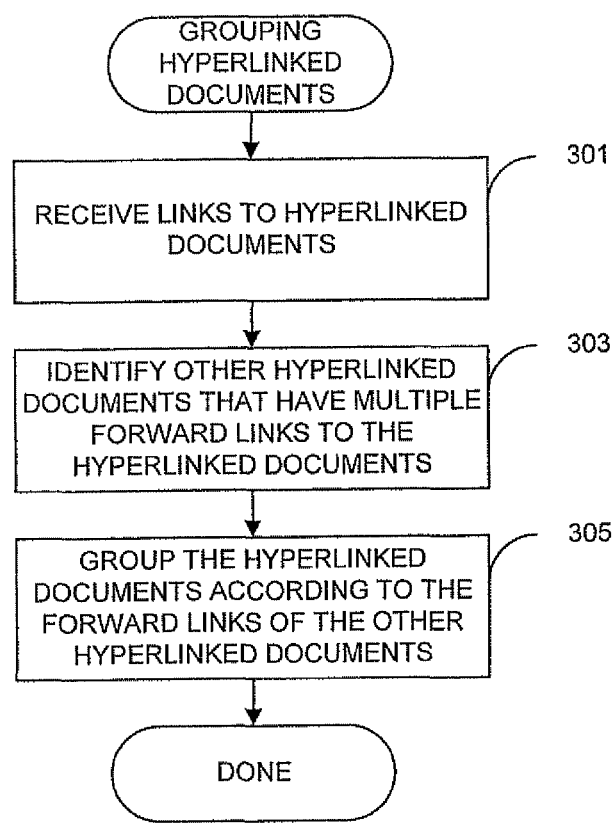
FIG. 5 shows a flow chart of a process of grouping hyperlinked documents.

Now that the example in FIG. 4 has been described, FIG. 5 shows a flow chart of a process of grouping hyperlinked documents. At a step 301, links to hyperlinked documents are received. The links that are received are the ones that will be grouped by topic. These links can be the results of a search (such as pages 201, 203, 209, 211, and 213 in FIG. 4) or they can be any set of links that it is desired to group by topic (such as web pages on a company's or university's intranet).

At a step 303, other hyperlinked documents are identified that have multiple forward links to the hyperlinked documents to be grouped. As shown in FIG. 4, pages can be identified like pages 205, 207, 215, and 217. Once other hyperlinked documents are identified that have multiple forwarded links to the hyperlinked documents to be grouped, all these pages or a subset of these pages (such as selected at random or some other criteria) can be utilized to group the hyperlinked documents.

The hyperlinked documents are then grouped according to the forward links of the other hyperlinked documents at a step 305. In general, the more hyperlinked documents there are that have forward links to two pages (or groups), the more likely it is that the two pages are related or on the same topic. In preferred embodiments, hierarchical clustering is utilized to group the hyperlinked documents.

Figure 6A:
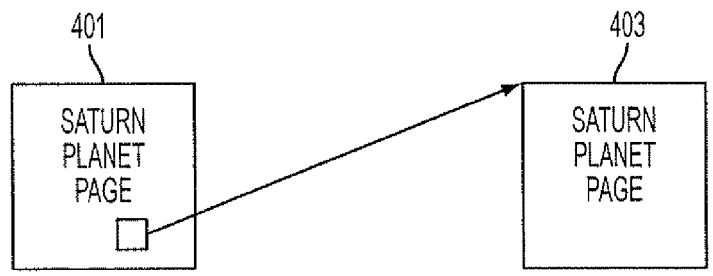
FIG. 6A shows of a web page on the planet Saturn having a forward link to another web page on the planet Saturn and FIG. 6B shows how the links can be considered to enhance grouping the web pages by topic.
Figure 6B:
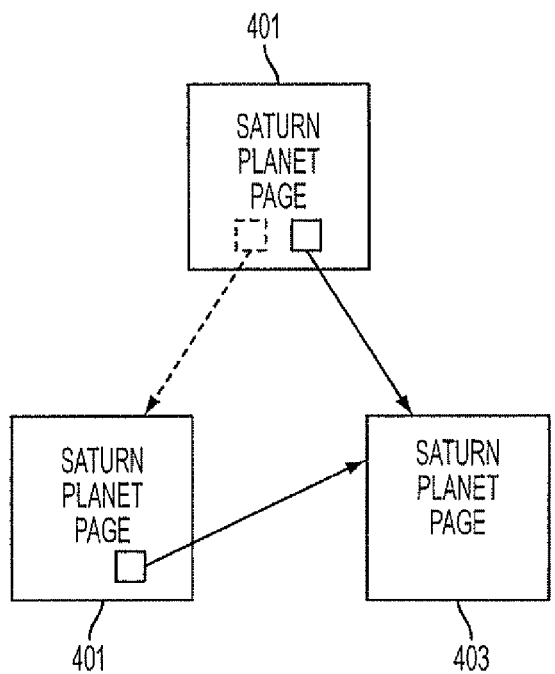

In some embodiments, the co-citation measure can also be used to account for direct links between pages. For example, FIG. 6A shows a Planet Saturn page 401 with a forward link to a Planet Saturn page 403. Without knowing that both web pages relate to the planet Saturn, they would still presumably be on the same topic because one includes forward link to the other web page. For example, it would be unlikely to find a page on the Saturn car pointing to a scientific page on the planet Saturn. For this reason, FIG. 6B shows that it can be assumed that there is self link from Planet Saturn page 301 to itself (as indicated by the dashed line). That is, the list of pages that can count as co-citing the pair, includes that pair of pages themselves. Because Planet Saturn page 301 now has a forward link to pages 301 and 303, the co-citation number for pages 301 and 303 would be 1. Thus, pages 301 and 303 would likely be considered related.

The distance definition described so far can be further improved. For example, it would be beneficial to account for the difference between highly popular pages and less popular pages. One can imagine that www.yahoo.com would have a high co-citation number with any other page on the web, even pages to which it is not related. Also, it would be beneficial for the hierarchical clustering algorithm to determine an appropriate stopping point, at which no two remaining groups will be grouped as being on the same topic. A solution that takes into account both of these issues can be had by appropriately penalizing popular pages and page groups as described below.

Figure 7:
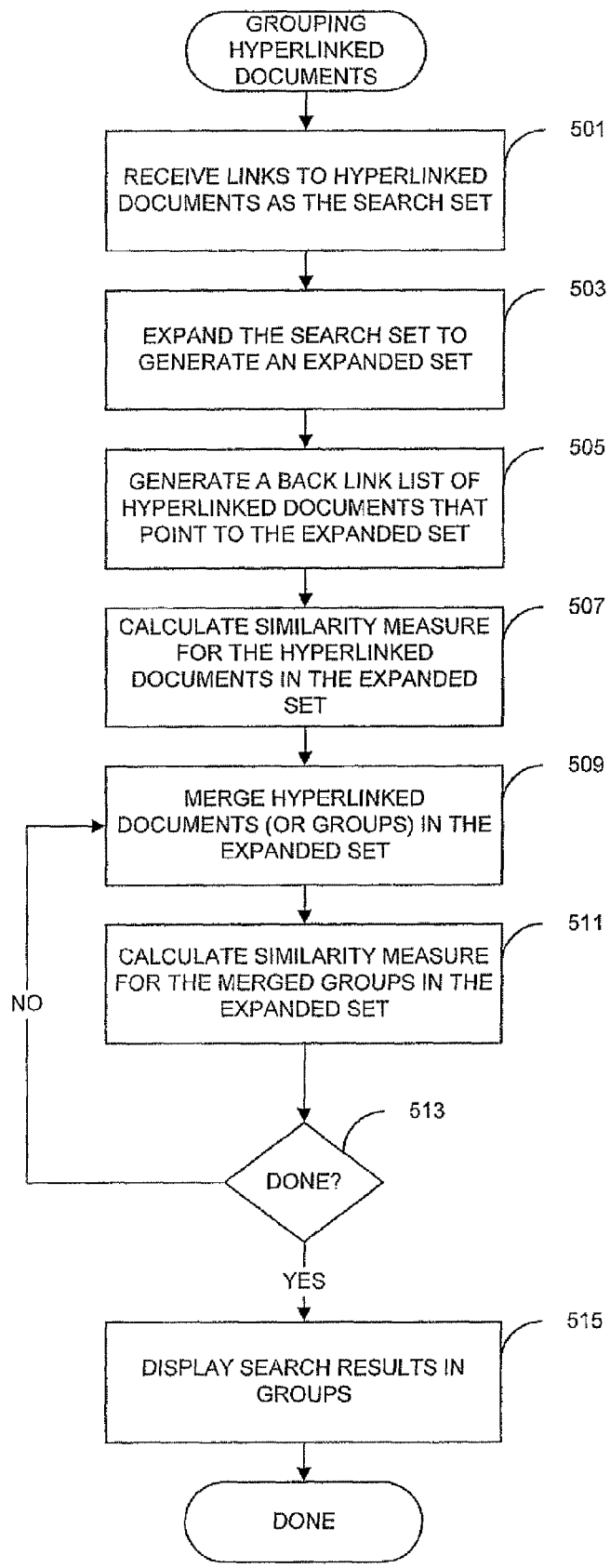
FIG. 7 shows a flow chart of a process of grouping hyperlinked documents that have been obtained from a search and utilizes a similarity measure to penalize popular web pages and groups.

FIG. 7 shows a flow chart of a process of grouping hyperlinked documents that have been obtained from a search and utilizes a similarity measure to penalize popular web pages and groups. At a step 501, links to hyperlinked documents are received as the search set. Typically, the links are an ordered set of search results that have been retrieved in response to a query. However, embodiments of the invention can be applied to any initial set of links to hyperlinked documents and is not limited to search results.

Figure 8B:
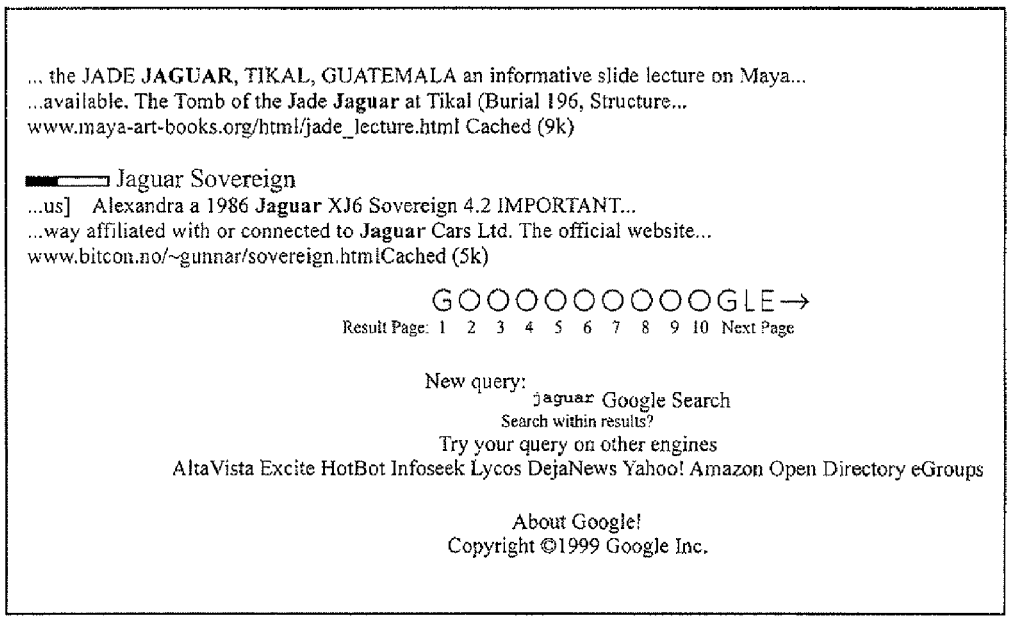

FIGS. 8A and 8B show a web page example of the first 10 web pages of the search results for the query "jaguar." The search results were obtained from the search engine from Google, Inc. For simplicity, these 10 pages will be considered the search set.

Returning to FIG. 7, the search set is expanded to generate an expanded set at a step 503. Typically, the search set will be expanded a small number of times, with each expansion adding to the set a small number of pages linking to and/or linked to by the search set. Conceptually, this obtains a small "neighborhood" around the original search set from which to gather more information (or links).

Figure 9:
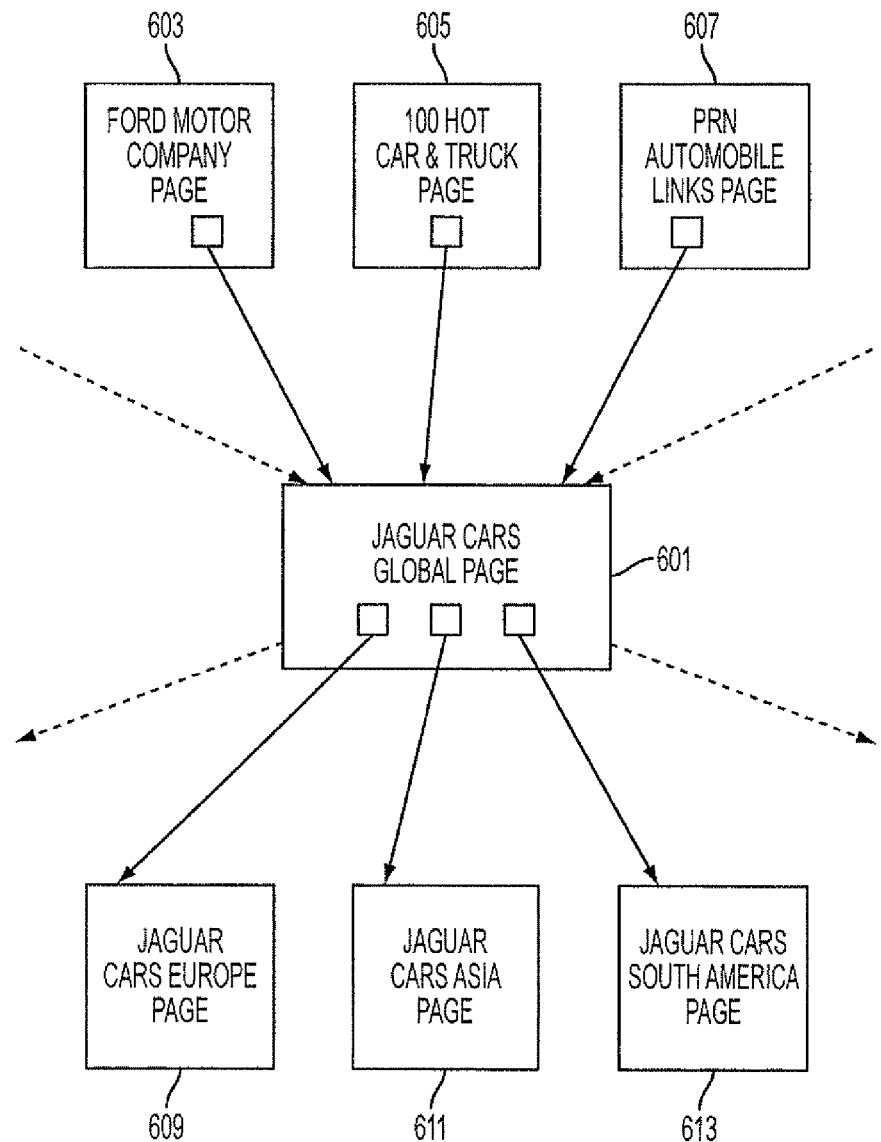
FIG. 9 shows additional web pages in the neighborhood of a Jaguar cars global page.

As an example, FIG. 9 shows web pages in the neighborhood of the a Jaguar cars global page 601, which was in the search set shown in FIGS. 8A and 8B. Although there are numerous web pages that have a forward link to page 601, three pages have been selected, a Ford Motor Company page 603, a 100 hot car & truck page 605 and a PRN automotive links page 607, that link to Jaguar cars global page 603. Additionally, although page 601 may include numerous forward links to other web pages, three pages have been selected, a Jaguar cars Europe page 609, a Jaguar cars Asia page 611 and a Jaguar cars South America page 613, that are linked to by Jaguar cars global page 601. A few links have to be selected (e.g., at random) for the purposes of an example from among all the links possible and arbitrarily three popular links were chosen in each direction.

The search set can be similarly expanded for the other web pages in the search set. Although FIG. 9 shows that links in both directions are added to the search set, links in only one direction can also be utilized. Additionally, links at more than one depth can be added. Furthermore, any number of criteria (e.g., popularity) can be utilized to select the links that are added to the search set to create the expanded search set. The new set that is created can be called the expanded set or, in the case of search results, the expanded search set. The web pages of the expanded search set are the links to be clustered.

Returning to FIG. 7, a back link list of hyperlinked documents are generated that point to the expanded search set at a step 505. If a web page is pointed to by a forward link, one can say that there is a back link to the other web page. Although the back link is not a physical link, information about what web pages point to each web page can be collected and stored by a web crawler. This information, along with additional collected information, is typically utilized in satisfying web queries.

Figure 10:
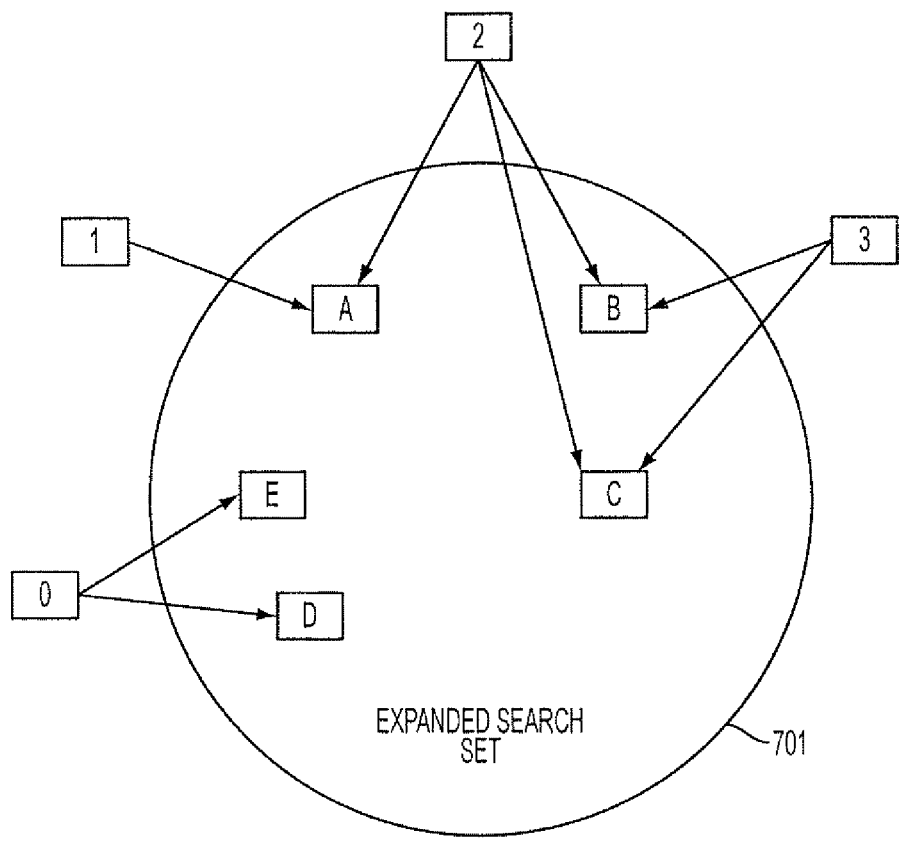
FIG. 10 shows an example of a back link list of hyperlinked documents that have forward links to an expanded search set of hyperlinked documents.

FIG. 10 shows an example of a back link list of hyperlinked documents that have forward links to an expanded search set of hyperlinked documents. An expanded search set is shown to include pages A-E. A back link list of links to hyperlinked documents that have forward links to expanded search set 701 can include links to pages 0-3. The process of obtaining the back link list can be similar to the process of generating an expanded search set except that only pages that point to the expanded set search set are identified. Additionally, the links in the back link list will not be clustered but they will be utilized in order to perform the clustering.

It should be noted that in FIG. 10 the pages of the expanded search set were enumerated with letters and the pages in the back link list were enumerated with numbers. This enumeration is only to better illustrate an embodiment of the invention. In a preferred embodiment, all pages are represented by a unique document identifier (e.g., an integer). It is this document identifier that is stored and manipulated.

Each page in the back link list that points to two or more pages in the expanded search set relates those pages. A hashing structure can be used to keep track of each individual originating page in order to speed up the subsequent enumeration of related pages. The hashing structure associates with each originating page, the list of pages in the expanded search set to which it points.

Figure 11:
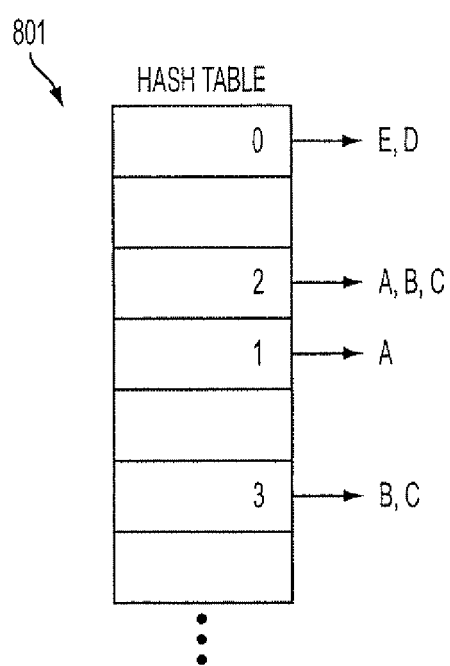
FIG. 11 shows a hash table that can be utilized to organize the relationships between the web pages in FIG. 10.

FIG. 11 shows a hash table that can be utilized to organize the relationships between the web pages in FIG. 10. A hash table 801 stores together all the search results linked to by a certain back link list element. For example, pages E and D are associated with the entry for the back link list element for page 0 since page 0 pointed to both these web pages. Pages A, B and C are associated with the entry for the back link list element for page 2. Page A is associated with the entry for the back link list element for page 1. Lastly, pages B and C are associated with the entry for the back link list element for page 3.

Hash table 801 is used here in order to more efficiently group the links together. This is because when the links are retrieved, they are in the reverse order of what is desired. For example, the back links to page A are known, but it is not readily known what other pages in the expanded search set are also pointed to by the back link pages. In order to do this inversion, all the links in the back link list are scanned and hashed into hash table 801 according to the originating document.

In order to generate hash table 801, a position for the originating document is identified and all the links from this originating are then stored at that position. For example, in hash table 801, page 2 hashes to the $3^{rd}$ position. The three links (2->A), (2->B) and (2->C) are similarly associated with that position because of the hashing function. Links to destination pages A, B and C are added to a list of pages associated with that position in hash table 801.

Returning to FIG. 7, a similarity measure is calculated for the hyperlinked documents in the expanded set utilizing the forward links in the back link list. The similarity measure is an indication of how related pages or groups of pages are to one another, and therefore whether they are likely on the same topic. One measure of similarity is the co-citation count as described above. However, in preferred embodiments, the similarity measure also takes into account the popularity of pages (e.g., penalizes popular pages) as follows.

In general, in order to determine pages in the expanded search set that are related, hash table 801 can be analyzed and used to relate each pair of expanded search set pages pointed to by a common page. In the example from FIGS. 10 and 11, page 0 relates pages E and D. Page 1 relates no pages. Page 2 relates pages A and B, A and C, and B and C. Page 3 relates pages B and C. By analyzing hash table 801, the co-citation number for every pair of pages can be determined. Because most pairs are not related, this co-citation number may be stored in a sparse matrix representation that allows the co-citation number for any pair of pages to be found quickly, with a minimal use of memory. As each link in the back link list is analyzed, for each pair of expanded search set pages that are associated by the link (e.g., pages E and D for page 0), a 1 is added to the pairs co-citation count. The completed matrix is called the co-citation matrix.

FIG. 12A shows a co-citation matrix 851 for our example from FIGS. 10 and 11. Only the upper diagonal of the matrix is used because the co-citation measure is symmetric. As shown, pages A and B are pointed to by page 2, and by no other page, therefore their co-citation number is 1. Similarly, pages A and C are pointed to only by page 2 so their co-citation number is also 1. Pages B and C, on the other hand, are pointed to by both pages 3 and 2, therefore their co-citation number is 2. Pages D and E are pointed to only by page 0, so their co-citation number is 1.

In addition to co-citation matrix 851, in some embodiments, a vector is formed of all related pages in order to allow faster access to the entire co-citation matrix. This vector is called the relationship vector. FIG. 12B shows a relationship vector 901 for this example. Relationship vector 901 shows pairs of pages that are shown to be related in co-citation matrix 851. Recall that to this point co-citation matrix 851 and relationship vector 901 relate only to pages (which can also be considered a group of pages including only one page), but as pages get merged into groups, these structures will store information on groups of pages as well. This will be seen in more detail in reference to FIG. 17.

Now that co-citation matrix 851 and relationship vector 901 have been generated, a similarity measure can be calculated between each pair of expanded search set pages. Although we know that each pair of pages in the relationship vector is related and the co-citation measure provides an estimate of the relatedness, the similarity measure can be further refined. The co-citation matrix and the back link count of each page can be utilized to determine a statistically balanced similarity measure between each pair of pages.

Some embodiments utilize a similarity measure that subtracts from the co-citation number a multiple of the product of the back link count of each of the two pages (or groups), taking into account the size of the Web. This number is then divided the square root of the product of the back link count of each of the two pages (or groups). These two steps normalize the results so that pages with high back link counts (i.e., that are pointed to a lot like www.yahoo.com) are not related to other pages more than they should be. This similarity measure is stored along with each pair of pages in an augmented relationship vector.

FIG. 13 shows an example of a formula that can be used to measure the similarity between each pair of pages (or groups). Co-citation(A, B) is the co-citation count between pages A and B. NumBL(A) and NumBL(B) is the number of back links to pages A and B, respectively. $\alpha$ and $\omega$ are parameters of this formula and $\alpha$ is usually set to a relatively small number (e.g., 10) and $\omega$ is an estimate of the number of pages on the Web.

The expression (NumBL(A)*NumBL(B))/$\omega$ is an estimate of how many pages would be expected to point to both A and B, if the Web were full of completely random links. $\alpha$ is used to make sure that only pages (or groups) are joined together that have many more co-citations than would be expected in a random Web link structure. The denominator of the similarity measure is desirable for normalization purposes to ensure that pages with lots of links, and therefore high co-citation numbers, do not drown out pages with fewer links. For example, pages that have an extremely high number of back links will also have a relatively higher denominator in the similarity measure, which will reduce the similarity measure for those pages.

FIG. 13 also shows a specific calculation for the example above relating to pages A and B from FIGS. 10, 11, 12A, and 12B. As shown, the co-citation number of pages A and B is 1. The number of back links for A and B are both 2 (see FIG. 10). $\alpha$ is set to 10 and $\omega$ is set to 100,000,000 in this example. However, since the number of pages on the Web is so large, the number that will be subtracted from the co-citation number of A and B is very close to 0. Therefore, their similarity ends up being approximately ½ as shown.

Figure 14:
FIG. 14 shows an augmented relationship vector.
Figure 15:
FIG. 15 shows a sorted relationship vector.

An augmented relationship vector can be generated from the relationship vector that includes the similarity measure for each related pair of pages (or groups). FIG. 14 shows an example of an augmented relationship vector 951 that includes similarity measure calculations that were performed as shown in FIG. 13. FIG. 15 shows a sorted relationship vector 1001 in which each element of the vector is sorted according to the similarity measure as shown. Sorted relationship vector 1001 will be utilized to determine which pages (or groups) to merge.

In this simple example, the subtraction adjustment had a minimal effect on the similarity measure calculation. This will usually be the case at the beginning of the clustering, but will change as the clustering proceeds. As pages are grouped together, their back link count increases, and therefore, this factor increases very rapidly. Eventually, this forces some large groups to have negative similarities, at which point, these groups will not no longer be clustered with other pages or groups. When all the groups have negative similarity measures to each other, clustering can be considered complete. Although the subtraction adjustment had little effect in this simple example, this is not typically the case with an actual web search.

Returning to FIG. 7, hyperlinked documents (or groups) in the expanded search set are merged at a step 509. As described above, each page can initially begin as its own group and the similarity measure is calculated as above. Typically, hierarchical clustering is utilized and the closest pair of groups is merged, forming a new group. Then the distance between this new group and the other groups can be recalculated. However, merging and recalculating one group at a time may be much too slow for a practical implementation over the Web, which should ideally run in under a second, and over a large number (typically thousands) of pages. In order to enhance performance, many groups of pages are simultaneously merged (e.g., hundreds of groups are processed at the same time).

Recall that sorted relationship vector 1001 shown in FIG. 15 indicates the similarity between each pair of groups and since it is sorted in descending order of similarity, the groups that are closest (most related) are at the beginning of the vector. The closest pairs are identified. As each closest pair is identified, an incidence vector (not shown) can be utilized to ensure that it will not be attempted to merge a group multiple times. Each member of the pair will be marked off the incidence vector so that marked pages will not be allowed to be used in further merges at this particular time.

Proceeding with the example, sorted relationship vector 1001 shows that the pair (B, C) occurs first, and are therefore closest. In this case, two pairs have the same similarity so they have been sorted lexicographically by their document identifiers (e.g., B is sorted before D). However, this is just one tie-breaking condition that can be used, which essentially breaks ties arbitrarily. At this point, neither page B nor page C has been scheduled for merging so they are scheduled for merging. A new identifier F is utilized to represent the merged group that will include pages B and C.

Figure 16:
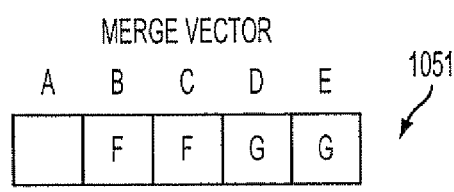
FIG. 16 shows a merge vector.

FIG. 16 shows a merge vector 1051 that indicates that group F will include pages B and C. Additionally, the incidence vector should be marked to indicate that pages B and C have been scheduled for merging.

The next element in sorted relationship vector 1001 indicates that pages D and E should be merged into a new group, after verifying that the incidence vector indicates that neither of these pages has already been scheduled for a merge. Group G will then be formed from merging pages D and E. This is shown in merge vector 1051. As before, the incidence vector should be marked to indicate that pages D and E have been scheduled for merging.

Still processing sorted relationship vector 1001, the next merge should be scheduled between pages A and B. However, the incidence vector indicates that page B has already been scheduled for a merge so no merge is scheduled for pages A and B. Page A of the incidence vector is now marked to indicate that it should not be merged at this point in time since there was a higher priority merge that should occur first.

Next, sorted relationship vector 1001 indicates that pages A and C should be merged. However, the incidence vector indicates that both pages should not be scheduled for a merge. Therefore, in the end, merge vector 1051 in FIG. 16 indicates that pages B and C should be merged to form a new group F and pages D and E should be merged to form a new group G. As shown, merge vector 1051 has a space for each existing group and page A is the only group that will not be merged this iteration.

The identification of many simultaneous merges is only one procedure that can be utilized to speed up this algorithm to make it practical over the Web. Another procedure is the simultaneous recalculation of the new co-citation matrix for the newly merged groups of pages. The true co-citation count can be calculated by determining how many pages have a forward link to pages from each group. However, this calculation can be time consuming. As a more efficient alternative, co-citation matrix 851 can be analyzed and the co-citation numbers summed to generate new co-citation numbers.

Figure 17:
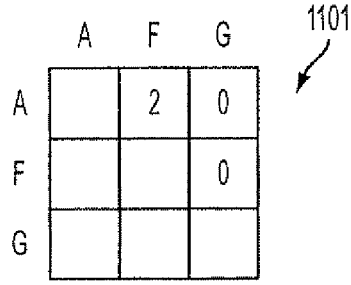
FIG. 17 shows a co-citation matrix after the merge.

For example, FIG. 17 shows a co-citation matrix 1101 as it will be after the merges have been performed. In order to calculate the co-citation number for groups A and F, one can add the co-citation number for pages A and B to the co-citation number for pages A and C (recall that group F includes pages B and C). Referring to co-citation matrix 851, the co-citation number for page A and group F is 1+1=2, as shown in FIG. 17. This summation can be performed for each co-citation pair that includes a newly merged group (the co-citation numbers for pairs that do not include a newly merged groups can be brought forward from the previous co-citation matrix). The summing of co-citation numbers for the newly merged groups allows new co-citation numbers to be rapidly determined.

This similarity measure for newly merged groups is a slight departure from the semantics of the co-citation numbers between pages. It is no longer exactly the number of pages that point to the pages of both groups. This is changed because the pages that point multiple times to both groups are super-counted. In other words, each such page is counted a number of times equal to the multiple of the link count to each of the two groups. For example, co-citation matrix 1101 seems to indicate that there are two pages that point to both page A and group F. However, there is actually only one page, page 2, that points to page A and group F (pages B and C). Therefore, the "true" co-citation count of page A and group F is 1. Therefore, the similarity measure is only an approximation to the "true" co-citation count of these two groups. However, it is much faster to calculate. This change in semantics can be important if this calculation is to be done efficiently for many groups of pages.

Returning to FIG. 7, it is determined if the merging of groups is done at a step 513. If not, steps 509 and 511 get repeated until no two groups of pages are related and scheduled for merging. As the groups of pages get bigger, their expected co-citation number (the subtracted expression in the formula in FIG. 13) become larger and it becomes harder for them to be related. This has the beneficial effect of ensuring that the process will end at the appropriate point. When no two groups of pages cross a threshold (e.g., are greater than 0), merging is considered complete.

At a step 515, the search results are displayed in groups. For example, each group can be sectioned off graphically from the other groups. In some embodiments, the pages that were added to generate the expanded search set are not displayed (i.e., only the pages of the search set are displayed). The displayed search results can be limited to the search set since these pages were the pages determined to be relevant to the query.

FIGS. 18A-18C show a web page example of search results being grouped by topic. The query was for web pages related to "Saturn." As shown, a first group 1201 includes pages that are related to the Planet Saturn, a second group 1203 includes pages that are related to the Saturn car and a third group include pages that are related to the Sega Saturn game system. Each group graphically separated or sectioned off from the other groups. Additionally, user interface options can be provided for selecting one group for further processing.

If there is not enough room to show all the pages of the groups, a small number of pages from each group may be displayed with the largest group or the most relevant pages being displayed first. The user can then be allowed to select one group and then more documents from that group are displayed. For example, in the Saturn query, one group will likely contain include most all of the relevant car documents and after the user selects that group, only information relevant to the Saturn car will be displayed.

One way to further speed up the clustering is to perform a preclustering of the Web. Sets of pages that are related can be grouped in advance and the search results are then first mapped into these sets. The link structure of the Web can be reduced with this preclustering, thereby shrinking it and speeding access to the links. This also reduces the amount of work to be done at search time as only these preclusters will then be clustered. Although preclustering can reduce the computations that are done in response to a search, more calculations will be done statically and the results may not be quite as good as when all the clustering is done at search time.

While the above is a complete description of preferred embodiments of the invention, various alternatives, modifications, and equivalents can be used. It should be evident that the invention is equally applicable by making appropriate modifications to the embodiments described above, Therefore, the above description should not be taken as limiting the scope of the invention that is defined by the metes and bounds of the appended claims along with their full scope of equivalents.

What is claimed is:

1. A computer-implemented method, comprising:
 identifying, by a device, a set of documents;
 expanding, by the device, the set of documents to generate an expanded set of documents,
  where the expanded set of documents includes all of the documents in the set of documents and one or more additional documents, and
  where each additional document, of the one or more additional documents, links to a document in the set of documents or is linked to by a document in the set of documents;
 determining, by the device, a similarity measure for each pair of documents in the expanded set of documents,
  where, for a pair of documents, in the expanded set of documents, consisting of a first document and a second document, the similarity measure is determined based on:
   a quantity of documents in the expanded set of documents that contain both a forward link to the first document and a forward link to the second document,
   whether the first document contains a forward link to the second document, and
   whether the second document contains a forward link to the first document; and
 clustering, by the device, the documents in the expanded set of documents into a plurality of clusters based on the similarity measures.

2. The computer-implemented method of claim 1, where the similarity measure, for the pair of documents, is determined further based on an inverse of the quantity of documents that contain both the forward link to the first document and the forward link to the second document.

3. The computer-implemented method of claim 1, where the similarity measure, for the pair of documents, is further determined based on a measure of popularity of the first document and a measure of popularity of the second document.

4. The computer-implemented method of claim 3, where the measure of popularity of the first document is determined based on a quantity of documents, in the expanded set of documents, that link to the first document.

5. The computer-implemented method of claim 3, where the similarity measure, for the pair of documents, is determined further based on normalizing a value derived from the quantity of documents that contain both the forward link to the first document and the forward link to the second document, and
 where the value is normalized based on the measure of popularity of the first document and the measure of popularity of the second document.

6. The computer-implemented method of claim 1, further comprising:
 receiving a particular query as input to a search engine,
  where each document in the set of documents is identified based on the particular query; and
 presenting information regarding the documents, in the expanded set of documents, based on receiving the particular query,
  where the information regarding the documents, in the expanded set of documents, is presented based on the plurality of clusters.

7. The computer-implemented method of claim 6, where presenting the information regarding the documents based on the plurality of clusters comprises:
 visually separating the information regarding any documents in one of the plurality of clusters from the information regarding any documents in another one of the plurality of clusters.

8. The computer-implemented method of claim 1, where the documents, in the expanded set of documents, include web pages and the forward links include hyperlinks.

9. The computer-implemented method of claim 1, where clustering the documents comprises performing hierarchical clustering on the documents.

10. The computer-implemented method of claim 1, where clustering the documents comprises:
 generating initial groups of documents, in the expanded set of documents, based on the similarity measures;
 determining a group similarity measure for each pair of groups of documents in the initial groups of documents,
  where, for a pair of groups of documents, in the initial groups of documents, consisting of a first group of documents and a second group of documents, the group similarity measure is determined based on a quantity of documents, in the expanded set of documents, that contain a forward link to a document in the first group of documents and contain a forward link to a document in the second group of documents; and
 clustering the initial groups of documents based on the group similarity measures.

11. A system, comprising:
 a memory to store instructions; and
 a processor to execute the instructions to:
  identify a plurality of documents;
  expand the identified plurality of documents to generate an expanded plurality of documents,
   where the expanded plurality of documents includes an entirety of documents in the identified plurality of documents and one or more additional documents, and
   where each additional document, of the one or more additional documents, links to a document in the identified plurality of documents or is linked to by a document in the identified plurality of documents;
  determine a similarity measure for each pair of documents in the expanded plurality of documents,
   where, for a pair of documents, in the expanded plurality of documents, that includes a first document and a second document, the similarity measure is determined based on
    a quantity of documents, in the expanded plurality of documents, that contain both a forward link to the first document and a forward link to the second document,
    whether the first document contains a forward link to the second document, and
    whether the second document contains a forward link to the first document; and group, based on the similarity measures, documents, included in the expanded plurality of documents, into clusters to form clustered documents.

12. The system of claim 11, where the processor is further to:
receive a query,
where the plurality of documents are identified based on the query; and
present, based on receiving the query and based on the clusters, information regarding the clustered documents.

13. The system of claim 12, where, when presenting the information regarding the clustered documents, the processor is further to:
visually distinguish documents, included in a first one of the clusters, from documents, included in a second one of the clusters,
where the first one of the clusters is different from the second one of the clusters.

14. The system of claim 11, where the documents, included in the expanded plurality of documents, include web documents, and
where the forward links include hyperlinks.

15. The system of claim 11, where, when grouping the documents into clusters, the processor is further to:
generate, based on the similarity measures, groups of documents in the expanded plurality of documents,
determine a group similarity measure for each pair of groups of documents, in the generated groups of documents,
where, for a pair of groups of documents, in the generated groups of documents, that includes a first group of documents and a second group of documents, the group similarity measure is determined based on a quantity of documents, in the expanded plurality of documents, that include a forward link to a document in the first group of documents and contain a forward link to a document in the second group of documents; and
cluster the generated groups of documents based on the group similarity measures.

16. A non-transitory computer storage medium storing instructions, the instructions comprising:
one or more instructions which, when executed by one or more processors, cause the one or more processors to identify a plurality of documents;
one or more instructions which, when executed by the one or more processors, cause the one or more processors to expand the identified plurality of documents to generate an expanded plurality of documents,
where the expanded plurality of documents includes an entirety of documents in the identified plurality of documents and one or more additional documents, and
where each additional document, of the one or more additional documents, links to a document in the identified plurality of documents or is linked to by a document in the identified plurality of documents;
one or more instructions which, when executed by the one or more processors, cause the one or more processors to determine a similarity measure for each pair of documents in the expanded plurality of documents,
where, for a pair of documents, in the expanded plurality of documents, that includes a first document and a second document, the similarity measure is determined based on:
whether the first document contains a forward link to the second document,
whether the second document contains a forward link to the first document, and
a quantity of documents, in the expanded plurality of documents, that contain both a forward link to the first document and a forward link to the second document; and
one or more instructions which, when executed by the one or more processors, cause the one or more processors to group, based on the similarity measures, documents, included in the expanded plurality of documents, into clusters to form clustered documents.

17. The non-transitory computer storage medium of claim 16, where the similarity measure, for the pair of documents, is determined based on an inverse of the quantity of documents that contain both the forward link to the first document and the forward link to the second document.

18. The non-transitory computer storage medium of claim 16, where the similarity measure, for the pair of documents, is determined further based on a measure of popularity of the first document and a measure of popularity of the second document, and
where the measure of popularity of the first document is determined based on a quantity of documents, in the expanded plurality of documents, that link to the first document.

19. The non-transitory computer storage medium of claim 16, where documents, included in the expanded plurality of documents, include web documents, and
where the forward links include hyperlinks.

20. The non-transitory computer storage medium of claim 16, the instructions further comprising:
one or more instructions which, when executed by the one or more processors, cause the one or more processors to present information regarding documents in the expanded plurality of documents,
where the one or more instructions to present the information regarding the documents comprise:
one or more instructions to visually separate the information regarding one or more of the documents in one of the clusters from the information regarding one or more of the documents in another one of the clusters.

* * * * *